United States Patent
Lucas et al.

(10) Patent No.: US 11,436,675 B2
(45) Date of Patent: Sep. 6, 2022

(54) SYSTEMS AND METHODS FOR DISTRIBUTED-LEDGER BASED INTRADAY TRADING

(71) Applicant: JPMORGAN CHASE BANK, N.A., New York, NY (US)

(72) Inventors: Scott Andrew Lucas, London (GB); Christine Moy, New York, NY (US)

(73) Assignee: JPMORGAN CHASE BANK, N.A., New York, NY (US)

(*) Notice: Subject to any disclaimer, the term of this patent is extended or adjusted under 35 U.S.C. 154(b) by 83 days.

(21) Appl. No.: 16/677,609

(22) Filed: Nov. 7, 2019

(65) Prior Publication Data
US 2020/0151818 A1    May 14, 2020

Related U.S. Application Data

(60) Provisional application No. 62/757,614, filed on Nov. 8, 2018.

(51) Int. Cl.
*G06Q 40/04* (2012.01)
*G06F 16/182* (2019.01)
(Continued)

(52) U.S. Cl.
CPC ......... *G06Q 40/04* (2013.01); *G06F 16/1837* (2019.01); *G06Q 20/3678* (2013.01); *G06Q 40/025* (2013.01); *H04L 9/0637* (2013.01)

(58) Field of Classification Search
CPC .. G06Q 40/04; G06Q 20/3678; G06Q 40/025; G06F 16/1837; H04L 9/0637
See application file for complete search history.

(56) References Cited

U.S. PATENT DOCUMENTS 7,660,762 B1* 2/2010 Mellina ................. G06Q 40/04
705/37
2016/0292680 A1* 10/2016 Wilson, Jr. ............ H04L 67/104
(Continued)

FOREIGN PATENT DOCUMENTS

| WO | 2016141361 | 9/2016 |
| WO | 2017007806 | 1/2017 |
| WO | 2018140913 | 8/2018 |

OTHER PUBLICATIONS

Baringa, Finteum and R3. An Intraday Liquidity Market using Blockchain Technology, (Oct. 19, 2018). (Year: 2018).*

(Continued)

*Primary Examiner* — Elizabeth H Rosen
(74) *Attorney, Agent, or Firm* — Greenberg Traurig LLP

(57) ABSTRACT

Systems and methods for distributed ledger-based intraday trading are disclosed. In one embodiment, a method may include: receiving a digital representation of an amount of collateral for a cash borrower; receiving a digital representation of an amount of cash for a cash provider; receiving agreement from the cash borrower and the cash provider to terms of an intraday trade comprising a duration of the intraday trade, a collateral trade amount of the collateral, and a cash trade amount of cash; a smart contract executing the intraday trade by providing the trade amount of the digital collateral to the cash provider and the cash trade amount of the digital cash to the cash borrower; and the smart contract returning the trade amount of the digital collateral to the cash borrower and the cash trade amount of the digital cash to the cash provider at the completion of the intraday trade.

7 Claims, 2 Drawing Sheets

(51) Int. Cl.
*G06Q 20/36* (2012.01)
*G06Q 40/02* (2012.01)
*H04L 9/06* (2006.01)

(56) References Cited

U.S. PATENT DOCUMENTS

| | | | |
|---|---|---|---|
| 2017/0011460 A1* | 1/2017 | Molinari | H04L 63/0823 |
| 2019/0340609 A1* | 11/2019 | Mayadas | G06Q 20/223 |
| 2020/0219188 A1* | 7/2020 | Celia | H04L 9/3239 |
| 2020/0226123 A1* | 7/2020 | Nixon | H04L 9/0643 |
| 2020/0250753 A1* | 8/2020 | Blount | H04L 9/0637 |

OTHER PUBLICATIONS

Santo, Atsushi; Ikuo Minowa; Go Hosaka, et al., "Applicability of Distributed Ledger Technology to Capital Market Infrastructure," Japan Exchange Group (Aug. 30, 2016). (Year: 2016).*

International Search Report, dated Mar. 3, 2020, from corresponding International Application No. PCT/US2019/060576.

Written Opinion of the International Searching Authority, dated Mar. 3, 2020, from corresponding International Application No. PCT/US2019/060576.

* cited by examiner

SYSTEMS AND METHODS FOR DISTRIBUTED-LEDGER BASED INTRADAY TRADING

RELATED APPLICATIONS

This application claims priority to, and the benefit of, U.S. Provisional Patent Application Ser. No. 62/757,614, filed Nov. 8, 2018, the disclosure of which is hereby incorporated, by reference, in its entirety.

BACKGROUND OF THE INVENTION

1. Field of the Invention

Embodiments are generally directed to systems and methods for distributed ledger-based intraday trading, settlement, and recordkeeping.

2. Description of the Related Art

The cost of liquidity is increasing alongside reduced availability of intraday liquidity, which may lead to stress in payment, clearing, and settlement activities in the financial markets. Additionally, current provision of intraday liquidity is typically limited through unsecured, uncommitted credit, which results in added credit/counterparty risk. Existing operational processes in the repo market prevent the meaningful use of intraday repo transactions to actively manage intraday liquidity, resulting in limited deployment of capital.

SUMMARY OF THE INVENTION

Systems and methods for distributed ledger-based intraday trading, settlement, and recordkeeping are disclosed. In one embodiment, in an information processing apparatus comprising at least one computer processor, a method for distributed-ledger based intraday trading may include: (1) receiving, at a distributed ledger, a digital representation of an amount of collateral for a cash borrower; (2) receiving, at the distributed ledger, a digital representation of an amount of cash for a cash provider; (3) receiving, at the distributed ledger, agreement from the cash borrower and the cash provider to terms of an intraday trade comprising a duration of the intraday trade, a collateral trade amount of the collateral, and a cash trade amount of cash; (4) a smart contract executing the intraday trade by providing the trade amount of the digital collateral to the cash provider and the cash trade amount of the digital cash to the cash borrower; and (5) the smart contract returning the trade amount of the digital collateral to the cash borrower and the cash trade amount of the digital cash to the cash provider at the completion of the intraday trade.

In one embodiment, the amount of collateral that is digitally represented on the distributed ledger may be ringfenced or locked by a collateral custodian.

In one embodiment, the amount of cash that is digitally represented on the distributed ledger may be separated or segregated from other cash by a cash bank.

In one embodiment, the digital representation of the amount of collateral may be written to a digital wallet for the cash borrower. The digital representation of the amount of cash may be written to a digital wallet for the cash provider.

In one embodiment, the amount of collateral that is digitally represented on the distributed ledger may be the same as the collateral trade amount. The amount of cash that is digitally represented on the distributed ledger may be the same as the cash trade amount.

In one embodiment, the duration of the intraday trade may be minutes or hours.

In one embodiment, the collateral may be a security.

In one embodiment, the method may further include verifying that the digital representation of the amount of collateral is sufficient for the collateral trade amount; and verifying that the digital representation of the amount of cash is sufficient for the cash trade amount.

According to another embodiment, in an information processing apparatus comprising at least one computer processor, a method for distributed-ledger based intraday trading may include: (1) receiving, at a distributed ledger, agreement from a cash borrower and a cash provider to terms of an intraday trade comprising a duration of the intraday trade, a collateral trade amount of the collateral, and a cash trade amount of cash; (2) receiving, at the distributed ledger, a digital representation of the collateral trade amount for a cash borrower; (3) receiving, at the distributed ledger, a digital representation of the cash trade amount for a cash provider; (4) a smart contract executing the intraday trade by providing the trade amount of the digital collateral to the cash provider and the cash trade amount of the digital cash to the cash borrower; and (5) the smart contract returning the trade amount of the digital collateral to the cash borrower and the cash trade amount of the digital cash to the cash provider at the completion of the intraday trade.

In one embodiment, the collateral trade amount of collateral may be ringfenced or locked by a collateral custodian. The cash trade amount of cash may be separated or segregated from other cash by a cash bank.

In one embodiment, the digital representation of the collateral trade amount is written to a digital wallet for the cash borrower. The digital wallet may be on a second distributed ledger.

In one embodiment, the digital representation of the cash trade amount may be written to a digital wallet for the cash provider. The digital wallet is on a second distributed ledger.

In one embodiment, the duration of the intraday trade may be minutes or hours.

In one embodiment, the collateral may be a security.

BRIEF DESCRIPTION OF THE DRAWINGS

In order to facilitate a fuller understanding of the present invention, reference is now made to the attached drawings in which.

DETAILED DESCRIPTION OF PREFERRED EMBODIMENTS

Embodiments are directed to systems and methods for intraday trading, settlement, and recordkeeping. Embodiments may use a distributed ledger (e.g., a Blockchain-based ledger) in a multiple participant intraday repurchase platform.

Embodiments may use instantaneous or near-instantaneous settlement and recording of assets and an expiry mechanism to minimize the risk of a non-return of cash/securities on maturity In embodiments, a trade flow may include the following elements or phases: (1) digital asset issuance; (2) trade execution; (3) trade settlement; (4) trade maturity; and (5) digital asset redemption. For example, once digital asset balances have been issued, representing the cash and secured interest in collateral respectively, cash providers and borrowers can agree to trade terms, executing trades and settling them via a swap in digital asset balance ownership. Ownership of the digital asset balances may provide the legal right to transfer the underlying, represented asset (e.g., cash, securities, or any secured property) from one party to the other.

Figure 1:
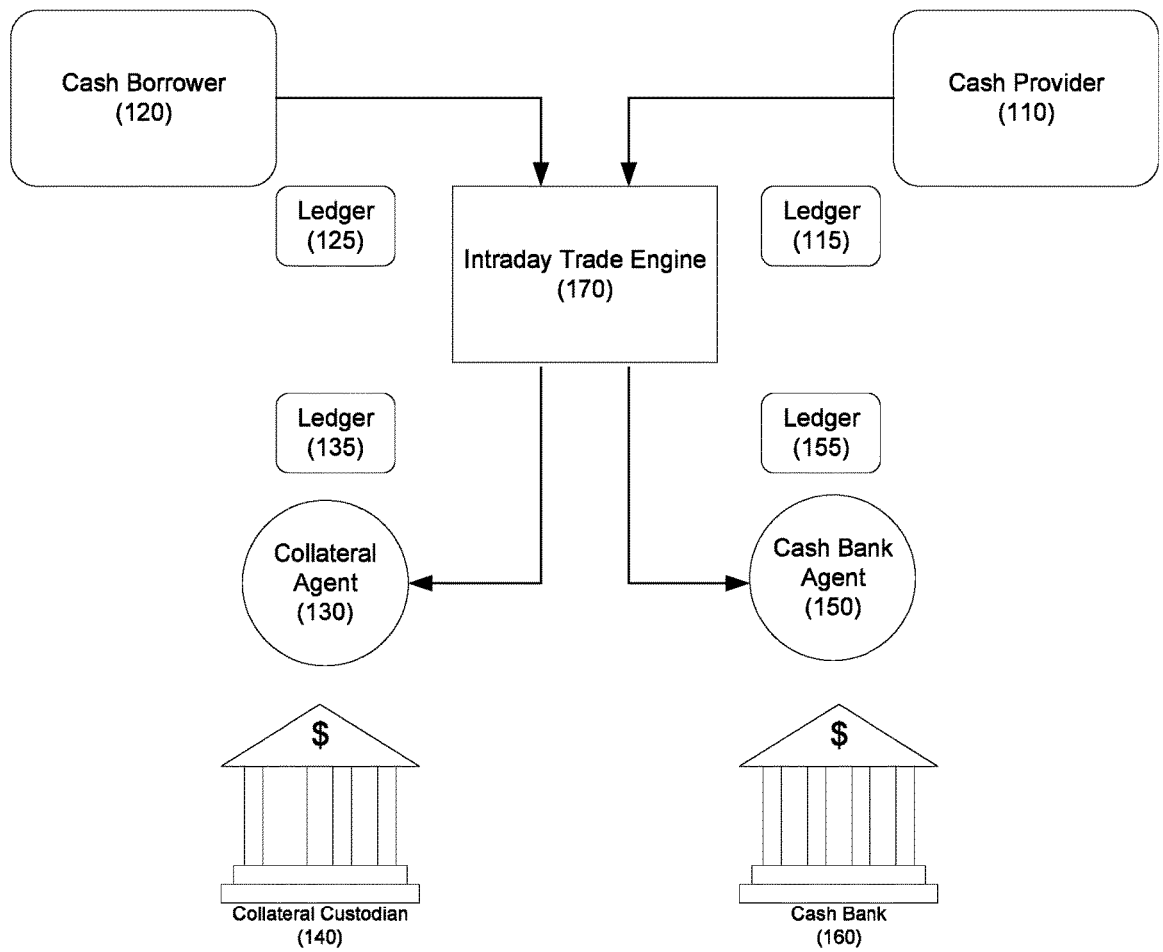
FIG. 1 discloses a system for intraday trading according to one embodiment.

Referring to FIG. 1, a system for intraday trading is disclosed according to one embodiment. System 100 may include cash provider 110, cash borrower 120, collateral custodian agent 130, collateral custodian 140, cash bank agent 150, cash bank 160, and intraday trade engine 170.

In one embodiment, cash provider 110 may be a provider of cash, and cash borrower 120 may be a borrower of cash. Cash provider 110 and cash borrower 120 may be individuals, corporations, etc. Cash borrower may have assets Collateral custodian 140 may manage and hold collateral for cash borrower 110. Collateral custodian agent 140 may represent or act on behalf of collateral custodian 140 with intraday trade engine 170.

Cash bank 160 may be any suitable financial institution that may hold an account for cash provider 110. Cash bank agent 150 may represent or act on behalf of cash bank 160 with intraday trade engine 170.

Intraday trade engine 170 may be a computer program or application that is executed by a server, in the cloud, etc. that may facilitate the intraday trade execution, settlement and maturity and recordkeeping of ownership positions. Intraday trade engine 170 may provide a distributed ledger for an execution and recordkeeping mechanism for certain functions.

In one embodiment, cash provider 110 and cash borrower 120 may be represented by nodes within the distributed ledger network, along with collateral custodian agent 130 and cash bank agent 150 via, for example, ledgers 115, 125, 135, and 155, respectively.

Figure 2:
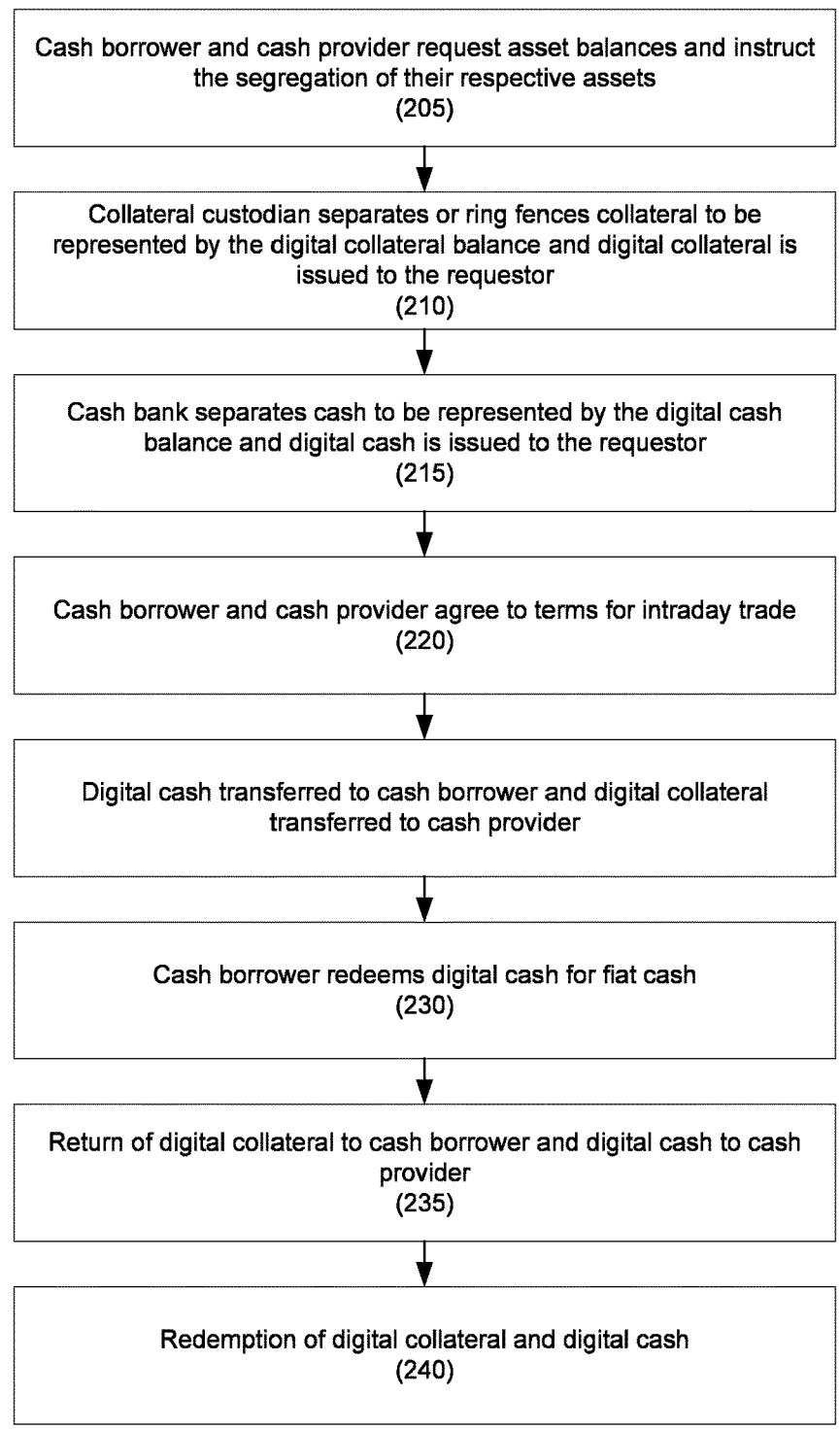
FIG. 2 depicts a method for intraday trading according to one embodiment.

Referring to FIG. 2, a method for distributed ledger-based intraday trading is disclosed according to one embodiment In step 205, a cash borrower and a cash provider may request the issuance of digital asset balances (collateral and cash, respectively) via, for example, an intraday trading engine. For example, the cash borrower and the cash provider may instruct their respective custodians (e.g., a collateral custodian and a cash bank) to segregate their underlying assets from the general pool of assets that their custodians hold.

In one embodiment, the intraday trade engine may communicate this request to a collateral agent and a cash bank agent.

In step 210, the collateral custodian may digitize the collateral by ringfencing, locking, or otherwise segregating the collateral to be represented by the cash borrower's digital collateral balance, and writing a representation of the digitized collateral to a distributed ledger. This effectively prevents the cash borrower from taking any other action with the underlying collateral that the digital balance represents. In one embodiment, the legal title to the securities represented by the digital collateral balance may be transferred to an account for the benefit of cash provider.

In one embodiment, the collateral agent may be responsible for ensuring the underlying collateral meets the valuation and eligibility requirements for the cash borrower's requested collateral balance on the intraday trade engine.

In one embodiment, the ring fencing and/or transferring of title may be written to the distributed ledger as the issuance of digital collateral. For example, the issuance of the digital collateral may be written to the cash borrower's digital wallet. In one embodiment, the digital wallet may be on a side distributed ledger.

In step 215, the cash bank may digitize the cash by separating the cash to be represented by the cash provider's digital cash balance and writing a representation of the digital cash to the distributed ledger. This effectively prevents the cash provider from taking any other action with the underlying cash that the digital cash represents. In one embodiment, the cash bank agent may be responsible for ensuring the underlying cash meets the cash lender's requested cash balance on the intraday trade engine.

In one embodiment, the separation may be written to the distributed ledger as the issuance of digital cash. For example, the issuance of the digital cash may be written to the cash provider's digital wallet. In one embodiment, the digital wallet may be on a side distributed ledger.

The intraday trade engine may have data transparency into the cash borrower's collateral account with the collateral custodian, and into the cash provider's cash account with the cash provider's bank. Alternatively, or in addition, the intraday trade engine may also have data transparency into the cash borrower's and the cash provider's digital wallets.

It should be noted that steps 205, 210, and 215 may occur in any suitable order, may occur simultaneously, etc.

In one embodiment, if the collateral is digital collateral, it may not be necessary to digitize the collateral.

In step 220, the cash borrower and the cash provider may agree to terms of an intraday trade. In one embodiment, the cash borrower and the cash provider may interact bilaterally. In another embodiment, the cash borrower and cash provider may interact in a marketplace, where active trades offered and bids may be provided. The trade terms may include the duration (e.g., minutes, hours, etc.), type of collateral (e.g., security), the amount of collateral, the amount of cash, eligibility schedule, currency, price, interest, and any other information that is necessary and/or desired. Agreement on trade terms may constitute the legal execution of an intraday trade.

In one embodiment, the intraday trade engine may verify that each party to the trade has the required digital asset balance before they are able to agree trade terms and execute the trade. The agreed-upon trade may be written to a distributed ledger, which may then provide the orchestration needed to conduct trade settlement and maturity. For example, a smart contract may orchestrate the trade.

It should be noted that agreement to trade terms (e.g., step 220) may precede the digitization of collateral and/or the digitization of cash (e.g., steps 210 and 215). For example, once the trade is agreed to, the intraday trade engine may cause the collateral custodian and the cash bank to digitize the collateral and cash required for the trade.

In step 225, the cash provider's digital cash may be transferred to the cash borrower (e.g., to the cash borrower's digital wallet), and in return, the cash borrower's digital collateral may be transferred to the cash provider (e.g., to the cash provider's digital wallet). This may occur simultaneously, substantially simultaneously, or in any desired order. The swap in ownership may be facilitated by and written to a distributed ledger.

In step 230, the cash borrower may redeem the digital cash for the fiat cash. For example, the cash bank agent and/or the bank may validate the cash borrower's ownership with the record held by the distributed ledger and provide the cash borrower with cash. In one embodiment, the cash borrower may need to re-digitize the cash balance prior to maturity.

In step 235, at the end of the intraday trade, the digital cash may be returned to the cash provider, and the digital collateral may be returned to the cash borrower. For example, the digital collateral may be returned to the cash borrower's digital wallet, and the digital cash may be returned to the cash provider's digital wallet. In one embodiment, a smart contract may orchestrate the return of the digital assets to the respective parties.

The cash borrower may further pay the agreed interest, and any fees, to the cash provider.

In one embodiment, the returns to, or the updated balances in the parties' digital wallets, may be written to the distributed ledger.

In step 240, the cash borrower and cash lender may choose to redeem their digital asset balance, respectively. The collateral agent and cash bank agent may validate the cash borrower and cash lender ownership in the digital asset balances via the distributed ledger. The collateral custodian and cash bank may then release the separation, ring fence, or lock on the collateral and cash assets, respectively.

The disclosure of U.S. patent application Ser. No. 16/653,369, U.S. patent application Ser. No. 16/558,415, U.S. patent application Ser. No. 15/869,421, U.S. Provisional Patent Application Ser. No. 62/725,331, and U.S. Provisional Patent Application Ser. No. 62/446,185 are hereby incorporated, by reference, in their entireties.

Although several embodiments have been disclosed, it should be recognized that these embodiments are not exclusive to each other, and certain elements or features from one embodiment may be used with another.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for distributed-ledger based intraday trading, comprising
   in an information processing apparatus comprising at least one computer processor:
      receiving, at a first distributed ledger and from a cash borrower digital wallet on a second distributed ledger, a digital representation of collateral for a cash borrower, wherein the collateral that is digitally represented on the first distributed ledger is ringfenced or locked by a collateral custodian, wherein the second distributed ledger is a side distributed ledger for the first distributed ledger;

receiving, at the first distributed ledger and from a cash provider digital wallet on the second distributed ledger, a digital representation of cash for a cash provider;

receiving, at the first distributed ledger, agreement from the cash borrower and the cash provider to terms of an intraday trade comprising an expiration of the intraday trade, a collateral trade amount of the digital representation of the collateral, and a cash trade amount of the digital representation of the cash;

a smart contract executed on the first distributed ledger orchestrating the intraday trade by:
  automatically providing the collateral trade amount to the cash provider digital wallet and the cash trade amount to the cash borrower digital wallet;
  writing a first change in ownership for the cash trade amount and the collateral trade amount to the first distributed ledger;
  automatically returning the collateral trade amount to the cash borrower digital wallet and the cash trade amount to the cash provider digital wallet at the expiration of the intraday trade; and
  writing a second change in ownership for the cash trade amount and the collateral trade amount to the first distributed ledger.

2. The method of claim 1, wherein the duration of the intraday trade is one of minutes or hours.

3. The method of claim 1, wherein the collateral comprises a security.

4. The method of claim 1, further comprising:
  verifying that the digital representation of the collateral is sufficient for the collateral trade amount; and
  verifying that the digital representation of the cash is sufficient for the cash trade amount.

5. A method for distributed-ledger based intraday trading, comprising
  in an information processing apparatus comprising at least one computer processor:
    receiving, at a first distributed ledger, agreement from a cash borrower and a cash provider to terms of an intraday trade comprising an expiration of the intraday trade, a collateral trade amount of the collateral, and a cash trade amount of cash;
    receiving, at the first distributed ledger and from a cash borrower digital wallet on a second distributed ledger, a digital representation of the collateral trade amount for a cash borrower, wherein the collateral that is digitally represented on the second distributed ledger is ringfenced or locked by a collateral custodian, wherein the second distributed ledger is a side distributed ledger to the first distributed ledger;
    receiving, at the first distributed ledger and from a cash provider digital wallet, a digital representation of cash for a cash provider;
    a smart contract executed on the first distributed ledger orchestrating the intraday trade by:
      automatically providing the collateral trade amount to the cash provider digital wallet and the cash trade amount to the cash borrower digital wallet;
      writing a first change in ownership for the cash trade amount and the collateral trade amount to the first distributed ledger;
      automatically returning the collateral trade amount to the cash borrower digital wallet and the cash trade amount to the cash provider digital wallet at the expiration of the intraday trade; and
      writing a second change in ownership for the cash trade amount and the collateral trade amount to the first distributed ledger.

6. The method of claim 5, wherein the duration of the intraday trade is one of minutes or hours.

7. The method of claim 5, wherein the collateral comprises a security.

* * * * *